United States Patent
Maesse

(10) Patent No.: US 8,396,621 B2
(45) Date of Patent: Mar. 12, 2013

(54) METHOD FOR DETERMINING THE SERVICE INTERVALS FOR A MOTOR VEHICLE

(75) Inventor: Pierre Henri Maesse, Rueil Malmaison (FR)

(73) Assignee: Peugeot Citroën Automobiles SA, Velizy Villacoublay (FR)

( * ) Notice: Subject to any disclaimer, the term of this patent is extended or adjusted under 35 U.S.C. 154(b) by 361 days.

(21) Appl. No.: 12/740,315

(22) PCT Filed: Oct. 21, 2008

(86) PCT No.: PCT/FR2008/051889
§ 371 (c)(1),
(2), (4) Date: Apr. 28, 2010

(87) PCT Pub. No.: WO2009/056720
PCT Pub. Date: May 7, 2009

(65) Prior Publication Data
US 2010/0262331 A1    Oct. 14, 2010

(30) Foreign Application Priority Data
Oct. 31, 2007 (FR) .................................... 07 58727

(51) Int. Cl.
*G01M 17/00* (2006.01)
(52) U.S. Cl. .................................................. 701/29.4
(58) Field of Classification Search .............. 701/30
See application file for complete search history.

(56) References Cited

U.S. PATENT DOCUMENTS
2002/0023433 A1    2/2002    Goerigk et al.
2007/0277502 A1    12/2007   Duvinage et al.

FOREIGN PATENT DOCUMENTS
WO    2005054636    *    6/2005
WO    2005054636 A2    6/2005

OTHER PUBLICATIONS
International Search Report corresponding to International Application No. PCT/FR2008/051889, mailed Mar. 26, 2009.

* cited by examiner

*Primary Examiner* — Thomas Tarcza
*Assistant Examiner* — Maceeh Anwari
(74) *Attorney, Agent, or Firm* — Polster, Lieder, Woodruff & Lucchesi, L.C.

(57) ABSTRACT

The invention relates to a method for determining service intervals for a motor vehicle fitted with an exhaust gas treatment system, the treatment consisting in selective catalytic reduction, in a catalytic converter, of the exhaust gases, using a reducing agent injected into the exhaust line, the method comprising the following steps, performed upon vehicle start-up: —the step of determining an initial value for the distance still to be covered before the next service, —the step of determining an actual distance covered since the last start, —the step of determining a quantity of reducing agent consumed since the last start, —the step of determining, as a function of this consumed quantity of reducing agent, a vehicle driving harshness factor, —the step of correcting the actual distance covered on the basis of the harshness factor, in order to obtain a weighted distance covered, and —the step of updating, on the basis of this weighted distance covered, an updated value of the distance still to be covered before the next service.

11 Claims, 1 Drawing Sheet

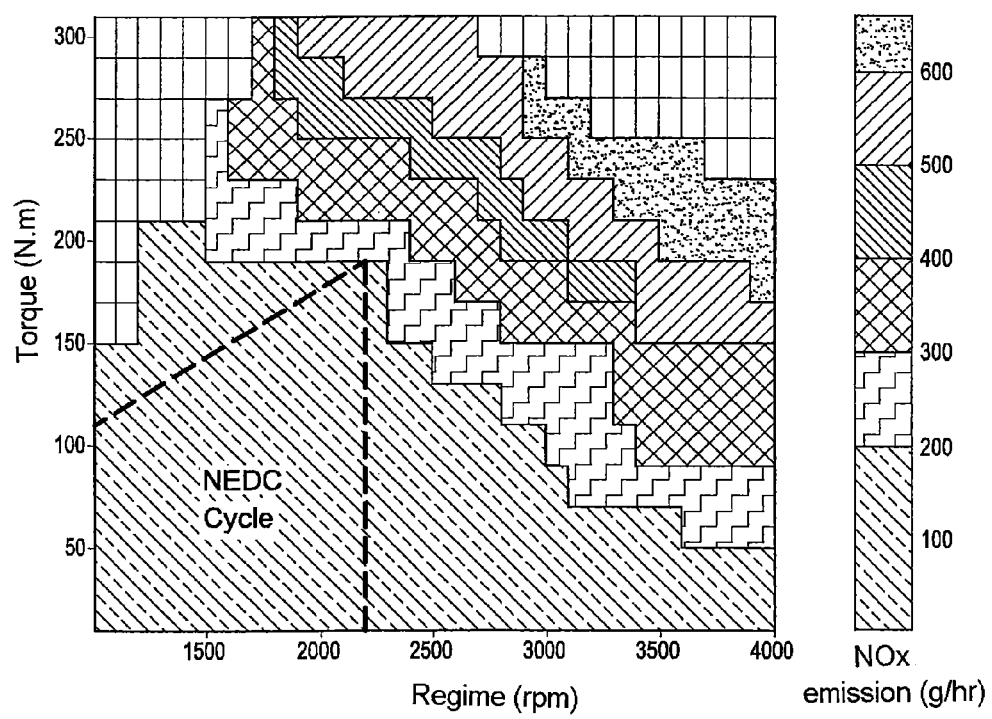

METHOD FOR DETERMINING THE SERVICE INTERVALS FOR A MOTOR VEHICLE

CROSS-REFERENCE TO RELATED APPLICATIONS

The present application is the US national stage under 35 U.S.C. §371 of International Application No. PCT/FR2008/051889 having an international filing date of Oct. 21, 2008, which claims the priority of French application 0758727 filed on Oct. 31, 2007.

FIELD OF TECHNOLOGY

This invention is related to the maintenance and overhaul of automotive vehicles provided with exhaust gas treatment systems using an agent injected in the exhaust line.

This invention, more particularly, is intended to be implemented in automotive vehicles provided with a system for treatment of the nitrogen oxides emitted by a diesel engine. The treatment is done by a selective catalytic reduction of the nitrogen oxides using a reducing agent such as ammonia.

These treatment systems permit treating the exhaust gases so that the vehicles obey the legally tolerated emission levels that are becoming progressively lower.

The selective catalytic reduction systems, called SCR, generally include an SCR catalyst, which is the seat of one or several chemical reduction reactions of the nitrogen oxides by ammonia.

This invention finds an advantageous application in vehicles provided with such systems, and in which the reducing agent, such as ammonia, is stored in a tank as an aqueous solution, for example in the form of urea.

BACKGROUND

Currently, SCR systems are relatively widespread in heavy duty diesel vehicles. In these vehicles, the refilling of the reducing agent tank is done simultaneously with refilling the fuel tank.

However, such a solution is difficult to consider for private drivers, who are not accustomed to handling a plurality of products necessary for the sound operation of a vehicle. In effect, leaving the refilling of a tank to an unskilled user risks handling errors, for example, the refilling of the reducing agent tank with another product, such as fuel, water, engine oil, or brake fluid.

SUMMARY

The disclosed method thus aims to remedy this drawback by providing that the amount of solution, such as the amount of urea, charged in the vehicle is sufficient to perform a correct reduction of the nitrogen oxides throughout the whole operating period of a vehicle between two maintenance sessions. Thus it is possible to limit the handling of the reducing agent by the vehicle user, since refilling the reducing agent tank is done at the time of the vehicle maintenance sessions, and this refilling is then accomplished by a person, such as a mechanic, with the necessary knowledge not to make a mistake.

A simple solution to guarantee a sufficient quantity of reducing agent involves making the dimensions (and hence the volume) of the reducing agent tank greater than the theoretical quantity of reducing agent required, in order to guarantee the possibility of always reducing the nitrogen oxides.

Such a solution is foreseeable in the case of a heavy haulage vehicle, but not in the case of a light vehicle, of small size, for which the weight reduction and footprint is a major challenge.

In such light or small vehicles, the manufacturers wish to dimension the size of urea tanks precisely. This can make planning some means to avoid any shortage of reducing agent during the driving phase of the vehicle impossible, and thereafter can cause a release of toxic gases into the atmosphere.

For this purpose, this a method is disclosed for determining the maintenance interval by taking into account the consumption of reducing agent during operation of the vehicle.

In current vehicles, methods are known for determining the overhaul and maintenance intervals according to wear conditions of some vehicle elements. Methods of determining a modification of the maintenance intervals according to a driver's behavior at the wheel are also known. Effectively, some types of driving, for example driving including numerous accelerations and phases of travelling at high speed, lead to a faster wear of the vehicle components, and therefore they must be checked, or even replaced more frequently than in the case of more regular driving.

However, none of these known solutions considers the parameters concerning a pollution reduction system installed in the vehicle.

The invention thus proposes a method for determining the maintenance interval for an automotive vehicle equipped with an exhaust gases treatment system which involves a selective catalytic reduction, in a catalyst, of the exhaust gases by a reducing agent injected in the exhaust line.

The method involves the following steps, performed at the time of the startup of the vehicle:
  determining an initial value of distance remaining to run before the next maintenance,
  determining the distance run since the last startup,
  determining the amount of reducing agent consumed since the last startup,
  determining, according to the amount of reducing agent consumed, a hard driving factor for the vehicle,
  correcting the actual distance run according to the hard driving factor, in order to obtain a weighted distance run, and
  updating, according to this weighted distance run, the value of the distance remaining to run before the next maintenance.

The amount of reducing agent available in the tank decreases during implementation of the chemical reduction reactions of the nitrogen oxides. Thus in one embodiment, to determine the amount of reducing agent consumed, the amount of nitrogen oxides emitted by the engine is determined, and, based on the chemical reactions brought into play in the catalyst, the amount of reducing agent required to reduce the nitrogen oxides is calculated.

The determination of the quantity of nitrogen oxides emitted can be done, for example, by measuring the nitrogen oxide emissions or by using a predetermined graph of the nitrogen oxide emissions according to the operating parameters of the engine. For example, the graph can be a graph of torque and RPM.

However, it is sometimes difficult to perform a correct measurement of the nitrogen oxides emitted by the engine, and the determination using a graph can prove to be inaccurate. In order to remedy these drawbacks, in one embodiment of the method, the determination of the amount of reducing agent consumed is done by comparing the fill level of the agent tank at the time of the startup with a fill level at the time of the prior startup.

In order to perform the measurement of this fill level of the agent tank, a continuous type sensor is used for example.

It should be noted that the precision of the measurement coming from such a sensor strongly depends in the shape of the tank. Effectively, if the tank has a flattened form, that is to say, a large base area and a low height, a small difference in level can correspond to a consumption of several liters of reducing agent.

It is therefore useful, in some embodiments, to make the determination by using both a measurement of the amount of nitrogen oxides and a measurement of the refilling level of the tank.

Information concerning the quantity of nitrogen consumed then permits, in a following stage of the method, determining a weighting factor reflecting the driver's behavior at the wheel of his vehicle, or a type of driving according to the traffic environment, for example in an urban environment or in an extra-urban (i.e., suburban or rural) environment. Such a weighting factor is, for example, a number between 0 and 10, from which the value of the distance run is weighted. Effectively, a journey of ten kilometers including many brakings and accelerations, either because it is done in urban environment, or because the user of the vehicle is a nervous driver, causes a wear on the vehicle greater than the normal wear for such a distance. Consequently, the weighting with the hard driving factor makes it possible to reflect this faster wear by fictitiously increasing or decreasing the distance run, to obtain the weighted distance run.

This notion of weighting will be subsequently detailed using examples.

Based on the weighted distance run, the remaining distance to run can be updated. In one embodiment of the method, this update involves subtracting the value of weighted distance run from the initial value of the remaining distance to run.

This initial value, for example, is the updated value during the previous implementation of the method.

On the other hand, at the time of the first implementation of the method after maintenance, the initial value, for example, is a value fixed by a vehicle manufacturer. This value can be fixed according to the vehicle model, the engine parameters, or the age of the vehicle.

In one advantageous embodiment, a method according to the invention is implemented by using an electronic computer installed in the vehicle. The electronic computer used for this purpose can be a computer already installed in the vehicle, for the management of the set of the devices, or a specific computer for the implementation of this method. In this case, it is possible to include in the method a step in which the remaining distance to run is stored in the computer memory. This memory storage permits, on the one hand, using the updated value for the subsequent implementation of the method and, on the other hand, to inform the driver of the next maintenance to be performed.

Thus, in one embodiment, the method involves reporting the remaining distance to run to the driver, for example by means of a display on the control panel.

The memory update, of the remaining distance to run, according to the embodiments, is done:
- by storing the initial value of the maintenance interval, defined by the manufacturer, on the one hand and on the other hand the cumulative value of the weighted distance run; in this case, the distance remaining to run corresponds to the difference between these two data; or
- by storing only the remaining distance to run, and by replacing this value, on each implementation of the method, by this value entered in memory from which the weighted distance run is subtracted.

Other advantages and features of the invention shall appear with the description of some of its modes of embodiment, this description being done under a non-restrictive heading using tables I and II shown in the following description, as well as FIG. 1 that shows a graph of the nitrogen oxide emissions in a engine, according to the engine parameters namely torque and regime.

DESCRIPTION OF THE FIGURE

The FIGURE shows, for every foreseeable "torque/RPM" pair in a vehicle, the amount of nitrogen oxides emitted. The dashed line delimits a zone of operation corresponding to the evolution of the engine parameters over a normalized operating cycle, called NEDC cycle (New European Driving Cycle). A NEDC cycle is composed of four urban cycles, so-called UDC (Urban Driving Cycle), and an extra urban cycle, called EUDC (Extra Urban Driving Cycle).

DETAILED DESCRIPTION

In current vehicles, if the driving of a vehicle is such that the operating parameters are located inside the zone delimited by the dashed line, the nitrogen oxide emissions from the engine are low, and the consumption of reducing agent is also accordingly low.

The maintenance intervals are defined by the drivers according to the oxide emissions over normalized cycles, for example the NEDC cycle.

However, as soon as the operating parameters of the vehicle are located outside of the zone defined by this cycle, the consumption of reducing agent increases strongly, which can lead to a shortage of reducing agent if the maintenance interval is not modified based on this consumption, and in particular if it is not reduced.

Consequently, in accordance with an aspect of the method according, a hard driving factor is determined allowing for the weighting of the distance run.

The following table (Table I) shows an example of evolution of a maintenance interval for different types of driving of a vehicle:

TABLE I

| | Haulage Profile | | |
|---|---|---|---|
| | 0% outside NEDC zones | 30% outside NEDC zones | 60% outside NEDC zones |
| | | Hard driving factor | |
| | 1 | 1.2 | 1.6 |
| Distance run by client (km) | Distance remaining to run before next overhaul dissplayed on the control panel (km) | | |
| 0 | 30,000 | 30,000 | 30,000 |
| 5,000 | 25,000 | 24,000 | 22,000 |
| 10,000 | 20,000 | 18,000 | 14,000 |
| 15,000 | 15,000 | 12,000 | 6,000 |
| 18,500 | 11,250 | 7,500 | 0 |
| 20,000 | 10,000 | 6,000 | |
| 25,000 | 5,000 | 0 | |
| 30,000 | 0 | | |

This table illustrates the case of a vehicle where the basic maintenance interval is fixed at 30,000 kilometers by the manufacturer. This value of 30,000 kilometers is the initial value of the distance to run, used at the time of the first implementation of the method after maintenance.

From the engine parameters, we determine, from the graph of the FIGURE, the amount of nitrogen emitted. The amount emitted permits determining the amount of reducing agent required in the first place to reduce the nitrogen oxides, and to determine thereafter a hard driving factor to apply to the distance run so as to weight it.

Table I thus shows an example of mean value of a hard driving factor for three different types of driving behavior.

We note that, for a user having a driving profile located entirely in the stippled zone of the graph of the FIGURE, called the NEDC zone, the maintenance interval remains equal to the maximum value determined by the manufacturer, namely 30,000 kilometers.

On the other hand, for an user having a harder driving profile, and where the behavior of the engine is located out of the NEDC zone for 30% of the time or 60% of the time, respectively, the interval will be revised lower with the progression of the successive startups, until attaining a value of 25,000 kilometers or 18,750 kilometers, respectively.

A method is also illustrated using Table II that shows in a detailed fashion the determination of the hard driving factor according to the consumption of reducing agent.

TABLE II

| Distance run | AdBlue Consump | Hard Driving Factor | Corrected distance | Cumulative Corrected distance | Remaining Corrected distance | No modification strategy | |
|---|---|---|---|---|---|---|---|
| | | | | | | Cumulative distance | Remaining distance |
| 1000 | 1 | 1 | 1,000 | 1,000 | 29,000 | 1,000 | 29,000 |
| 500 | 0.8 | 1.6 | 800 | 1,800 | 28,200 | 1,500 | 28,500 |
| 300 | 1.5 | 5 | 1,500 | 3,300 | 26,700 | 1,800 | 28,200 |
| 200 | 2 | 10 | 2,000 | 5,300 | 24,700 | 2,000 | 28,000 |
| 1,000 | 0.9 | 0.9 | 900 | 6,200 | 23,800 | 3,000 | 27,000 |

During a first driving phase, a customer runs 1000 kilometers, during which he consumes 1 liter of an aqueous urea solution, for example AdBlue.

This consumption is then compared to the theoretical consumption of AdBlue for a journey of this distance. The theoretical consumption is calculated, for example, according to the theoretical nitrogen emissions on this distance during an NEDC cycle. Another possible way to calculate this theoretical consumption involves accumulating the theoretical injection amounts of reducing agent during a journey of this distance.

At the time of this first phase, the AdBlue consumption actually noted is equal to the theoretical AdBlue consumption. Consequently, the hard driving factor, or weighting factor, is determined as being equal to 1. The weighted distance run is therefore equal to the actual distance run.

On the other hand, during the second phase, a quantity of 0.8 liter of AdBlue is consumed for a distance run of only 500 kilometers. However, the theoretical consumption for this distance is 0.5 liters. Consequently, the quantity of AdBlue actually consumed is greater than normal. Then the hard driving factor is determined to be greater than 1, here equal to 1.6. The weighted distance run is the result of the weighting (i.e., multiplying) of the actual distance, namely 500 kilometers, by the hard driving factor, and is therefore equal to 800 kilometers.

The starting maintenance interval was fixed at 30,000 kilometers. In this case, the application of a method in conformity with the invention permits reducing this interval to 28,200 kilometers, or a discrepancy of 1800 kilometers, whereas the distance actually run is only 1500 kilometers.

The last column of Table II shows the values of the maintenance interval in the case of a system not implementing the method of the invention.

During the third and fourth phases of driving, the AdBlue consumption is also greater than the theoretical consumption, and the hard driving factors determined are therefore greater than 1.

On the other hand, it is noted that during the last driving phase, an amount equal to only 0.9 liter of AdBlue is consumed. This quantity is less than to the theoretical quantity, and the hard driving factor is determined therefore as being less than 1.

Thus, the weighted distance run is less than the actual distance. We therefore note, in Table II, that after a run of 3000 kilometers, the distance to run before the next maintenance has now been reduced by 6200 kilometers, and not 3000 kilometers, as it is the case in a system not implementing a modification method of the maintenance intervals.

In accordance with an aspect of the method, the method therefore permits avoiding any declaration of failure of an exhaust gas treatment system, by guaranteeing a sufficient quantity of reducing agent to reduce the nitrogen oxides between two maintenances.

This method is, otherwise, relatively easy to implement in a vehicle since it does not require any adaptation of parts, and therefore no surcharge at the time of producing the vehicles.

Such a method is, surely, particularly adapted to an implementation in a treatment system by selective catalytic reduction, but it can be used in any other system charged with the tanks requiring a refilling phase at the maintenance intervals of the vehicle.

The invention claimed is:

1. A method of determining a maintenance interval for an automotive vehicle equipped with an exhaust gas treatment system, the treatment system including a selective catalytic reduction, in a catalyst, of the exhaust gases by a reducing agent injected in the exhaust line, the method including the following steps, performed by a computer at the time of startup of the vehicle:
   determining an initial value of distance remaining to run before the next maintenance,
   determining actual distance run since the last startup,
   determining the amount of reducing agent consumed since the last staff up startup,
   determining, according to the amount of reducing agent consumed, a hard driving factor for the vehicle, the hard driving factor being a ratio of (i) the amount of reducing agent used in the actual distance run since the last startup and (ii) a theoretical amount of reducing agent used for the actual distance run since the last startup;
   determining a weighted distance run by multiplying the actual distance run by the hard driving factor, and
   updating the distance remaining to run before the next maintenance according to the weighted distance run.

2. The method according to claim 1, wherein the determination of the amount of reducing agent consumed since the last startup is made by comparing a refilling level of the agent's tank at the time of the startup with a refilling level at the time of the previous startup.

3. The method according to claim 2, wherein the level of reducing agent in the agent tank for refilling the agent tank is measured using a continuous type sensor.

4. The method according to claim 1, wherein the determination of the amount of reducing agent consumed since the last startup is made by determining the amount of nitrogen oxides emitted by the engine, and by calculating, according to the chemical reactions brought into play in the catalyst, the amount of reducing agent required to reduce these nitrogen oxides.

5. The method according to claim 4, wherein the determination of the amount of nitrogen oxides emitted by the engine is done by using a predetermined graph of the nitrogen oxide emissions according to the engine operating parameters.

6. The method according to claim 1, wherein the update of the remaining distance to run involves subtracting the value of the weighted distance run to from initial value of the remaining distance to run.

7. The method according to claim 1, wherein the initial value of the distance to run corresponds to the updated value from an immediately previous implementation of the method.

8. The method according to claim 1 wherein, at the time of the first implementation of the method after a maintenance, the initial value of the distance to run corresponds to a value fixed by the vehicle manufacturer.

9. The method according to claim 1 including a step of storing, in the memory of a computer installed in the vehicle, the value of the remaining distance to run.

10. The method according to claim 1 further including a step of reporting to a vehicle driver the remaining distance to run.

11. The method according to claim 10, wherein the step of reporting the remaining distance is done by means of a display on a control panel.

* * * * *

UNITED STATES PATENT AND TRADEMARK OFFICE
CERTIFICATE OF CORRECTION

PATENT NO. : 8,396,621 B2
APPLICATION NO. : 12/740315
DATED : March 12, 2013
INVENTOR(S) : Pierre Henri Maesse It is certified that error appears in the above-identified patent and that said Letters Patent is hereby corrected as shown below:

In the Claims:

Col. 6 (Claim 1), Line 55
  Replace "the last staff up startup"
  with --the last startup--

Signed and Sealed this
Fourth Day of June, 2013

Teresa Stanek Rea
*Acting Director of the United States Patent and Trademark Office*